US006179559B1

(12) United States Patent
Weaver

(10) Patent No.: US 6,179,559 B1
(45) Date of Patent: Jan. 30, 2001

(54) VARIABLE CAMBER VANE

(75) Inventor: Kevin J Weaver, Clevedon (GB)

(73) Assignee: Rolls-Royce PLC, London (GB)

( * ) Notice: Under 35 U.S.C. 154(b), the term of this patent shall be extended for 0 days.

(21) Appl. No.: 09/329,317

(22) Filed: Jun. 10, 1999

(30) Foreign Application Priority Data

Jun. 19, 1998 (GB) .................................................. 9813254

(51) Int. Cl.⁷ .................................................. F01D 17/12
(52) U.S. Cl. .......................................... 415/161; 415/150
(58) Field of Search .................................... 415/142, 150, 415/159, 161, 162, 160, 148

(56) References Cited

U.S. PATENT DOCUMENTS

| 3,695,777 | * | 10/1972 | Westphal et al. ..................... | 415/216 |
| 3,990,810 | * | 11/1976 | Amos et al. .......................... | 415/161 |
| 4,741,665 | * | 5/1988 | Hanser ................................. | 415/150 |
| 4,821,758 | | 4/1989 | Ruis . | |
| 5,314,301 | * | 5/1994 | Knight ................................. | 415/160 |
| 6,045,325 | * | 4/2000 | Horvath et al. ....................... | 415/161 |

FOREIGN PATENT DOCUMENTS

| 1 250 324 | 12/1968 | (GB) . |
| 1 249 279 | 10/1971 | (GB) . |
| 1 263 857 | 2/1972 | (GB) . |
| 2 028 438 | 8/1979 | (GB) . |
| 2 218 746 | 11/1989 | (GB) . |

* cited by examiner

Primary Examiner—Edward K. Look
Assistant Examiner—Ninh Nguyen
(74) Attorney, Agent, or Firm—Oliff & Berridge, PLC

(57) ABSTRACT

A variable camber vane for the inlet of a gas turbine engine has a pivoting trailing section behind a fixed leading section. In order to accommodate a wide range of flow conditions the trailing section is movable through a wide angle about its upstream edge. The surrounding casing profile and the radially outer edges of the vane trailing sections are matching part-spherical surfaces. As a result of the large angle of movement the trailing section is subjected to substantial turning forces. To contain the forces the curved radially outer edges of each trailing section is formed with a broad flange which tapers in the direction of the vane trailing edge, and for aerodynamic efficiency the flange is smoothly blended into the vane aerodynamic surfaces.

9 Claims, 3 Drawing Sheets

VARIABLE CAMBER VANE

The invention relates to a variable camber vane for a gas turbine engine.

More particularly the invention concerns the movable section of a variable camber intake guide vane which forms part of a vane ring in the intake of a gas turbine propulsion engine ahead of the first compressor rotor stage.

In order to maintain operating stability of the compressor of a gas turbine propulsion engine over a wide range of mass flow rates and operating speeds it is considered advisable to employ a movable vane. Such vanes have two major aerodynamic effects: one, to turn the airstream through an angle to meet the blades of a succeeding rotary stage; two, to reduce the effective inlet area of the stage. Because the dimensions of the inlet tract are relatively large at the front of an engine such vanes are correspondingly big and the aerodynamically generated forces acting on a movable blade when it is turned to the incoming airstream are also large. It is usual for the vanes to be pivoted on an axis in the mid-chord region in order that the forces may be balanced about the axis. This reduces the actuation forces required to turn and hold the vane, and consequently the stresses and strains to which the vane is subject as compared to an edge pivoted vane.

However, in some circumstances it may be necessary to employ an edge pivoted vane in which case the problems resulting from high and unbalanced forces acting on the vane have to be tackled. The present invention has for one objective to provide a solution to these problems.

According to one aspect of the invention there is provided a variable camber vane for a gas turbine engine comprising a fixed leading section and a movable trailing section comprising a vane section pivotally mounted about an axis through its upstream edge adjacent the downstream edge of the fixed leading section wherein a radially outer edge of the movable section and the surface of a surrounding casing are matching part-spherical surfaces in a region including at least the sweep of the movable vane section and the radially outer edge of the movable vane section is flanged and curved to match the part-spherical surface of the adjacent casing region.

Figure 1:
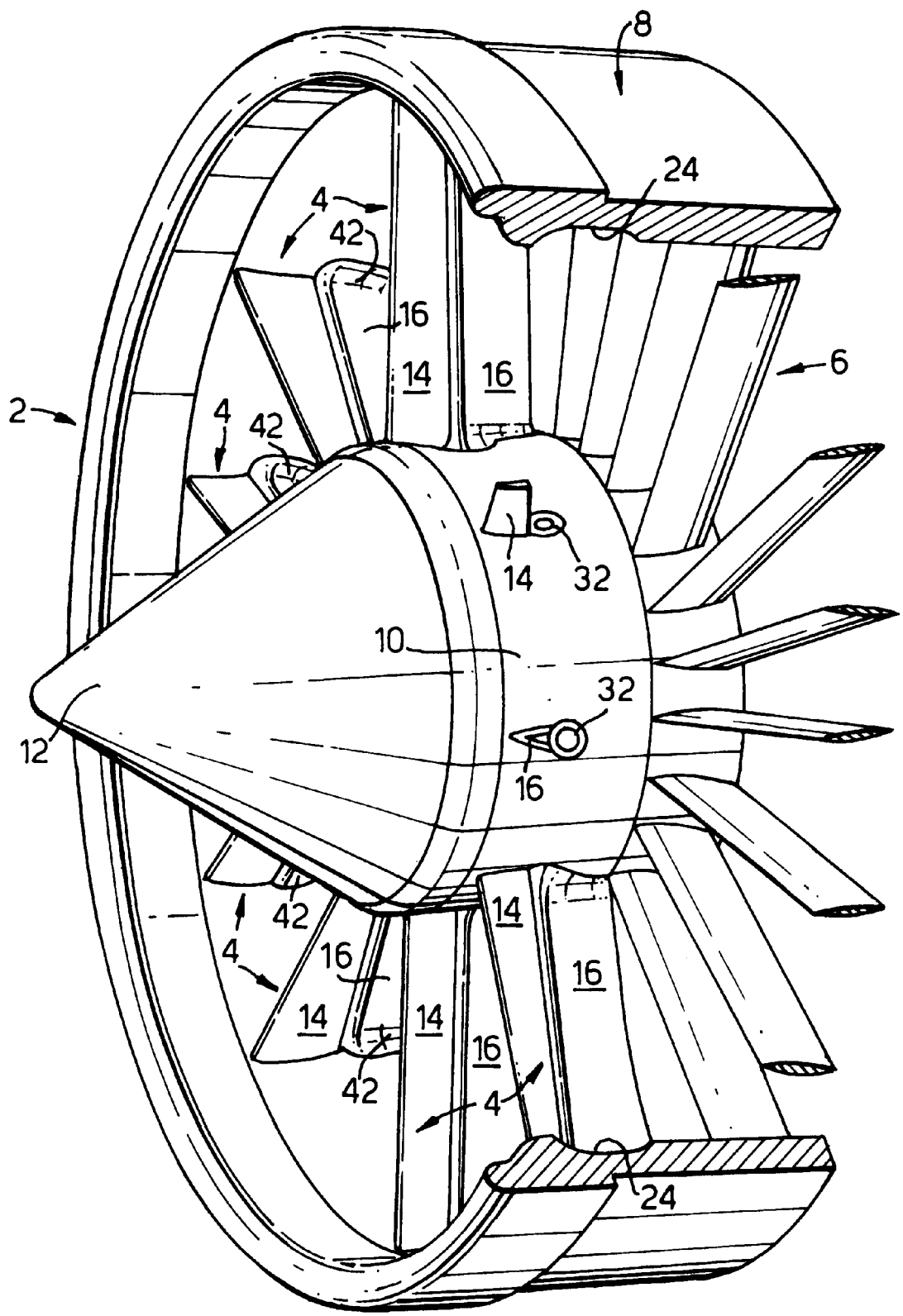
Figure 2:
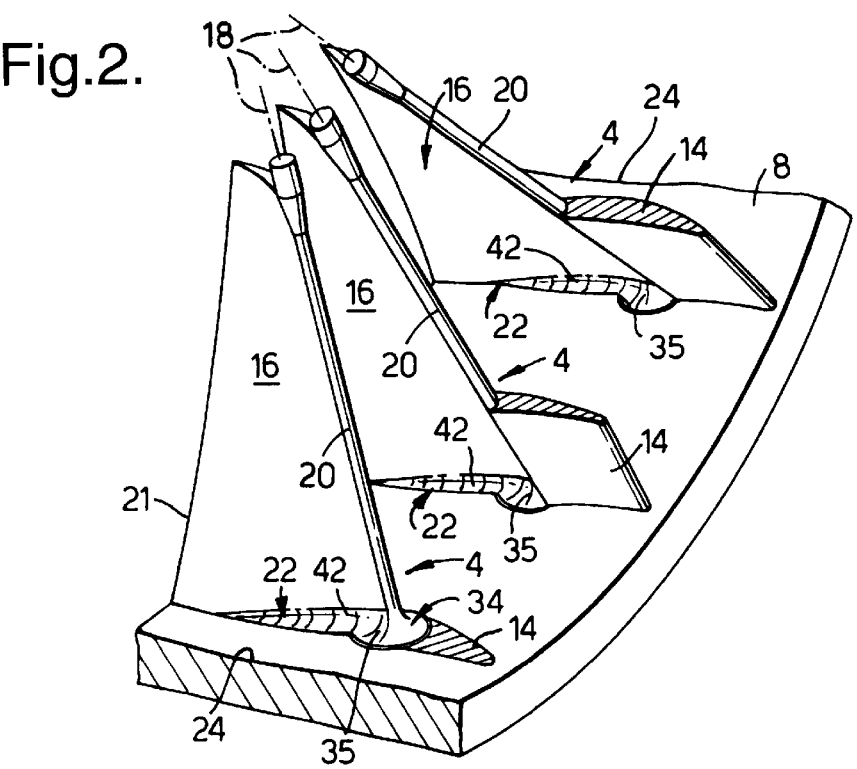
Figure 3:
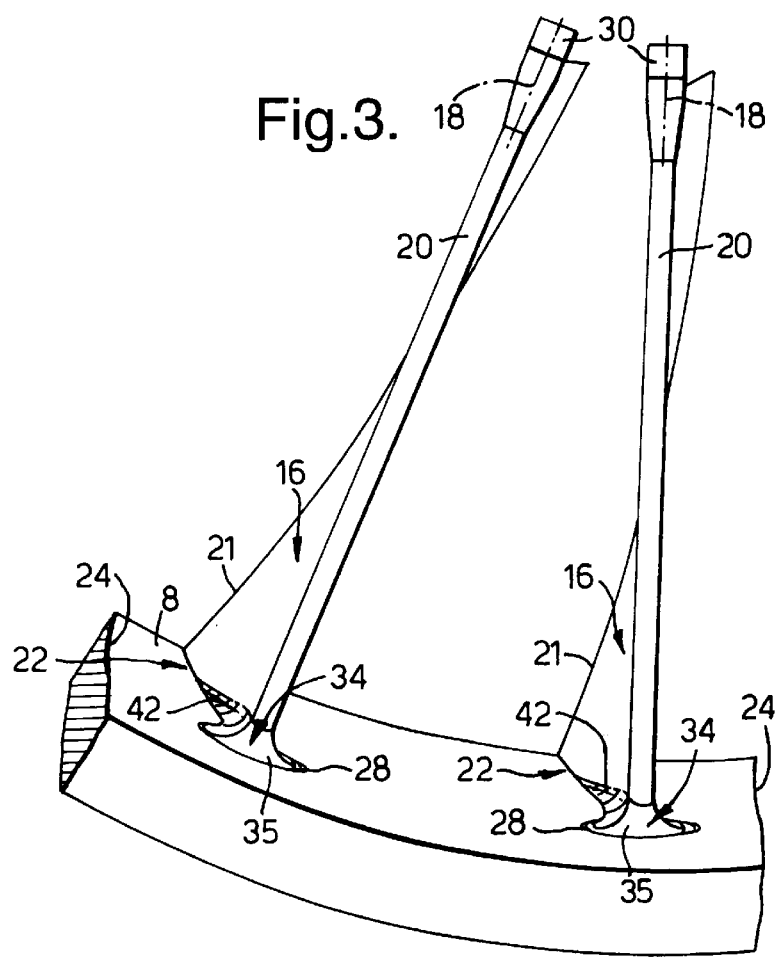
Figure 4:
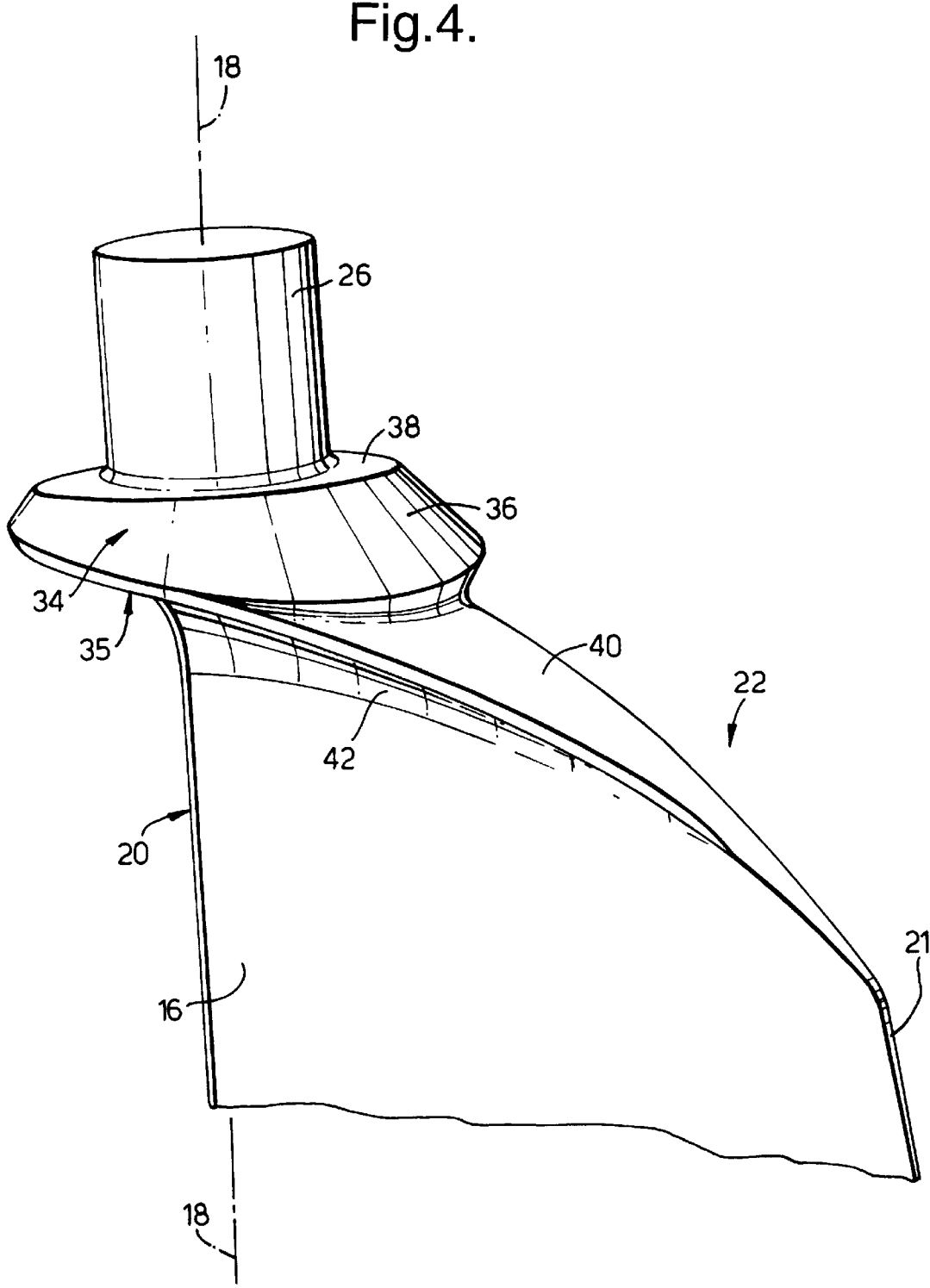

A preferred embodiment of the invention will now be described with reference to the accompanying drawings, in which:

FIG. 1 shows a part cut-away view of an engine inlet annulus incorporating a ring of variable camber vanes, FIG. 2 shows a section of the casing including three of the variable camber vanes, FIG. 3 shows a section of the movable sections of two variable camber vanes, and FIG. 4 shows a close-up view of the radially outer edge of the movable section of a vane of FIGS. 1–3 illustrating the circular bearing member, and the curved outer, flanged edge.

Referring to the drawings, FIG. 1 shows an engine inlet annulus generally indicated at 2 incorporating a ring of ten variable camber vanes 4 spaced apart equidistantly around the intake annulus of the engine. Also visible is a first compressor rotary stage generally indicated at 6. Surrounding the intake annulus is an engine casing structure 8 partly cut-away to reveal some more details of the vanes 4. The vanes 4 extend in a generally radial direction between the outer engine casing 8 and an inner concentric structure generally indicated at 10 within which there may be provided a front engine bearing (not shown) supporting the front end of an engine shaft carrying the rotary stage 6. The front of the circular bearing housing structure 10 is enclosed by a conventional tapering nose bullet 12. Generally, in order to support the front shaft bearing, the vanes 4 incorporate a fixed, and load bearing section. This fixed upstream vane section has a part airfoil shape as can be seen more clearly in FIG. 2. The fixed portion of each of the vanes is indicated by reference 14 and in all the drawings like parts carry like references.

In FIG. 2 the fixed vane sections 14 are partly sectioned in order to show the airfoil shape more clearly. It will be apparent that the thickness of the vanes gradually increases in a downstream direction up to the upstream edge of the movable sections 16 of each of the vanes. The movable sections 16 conform to the overall airfoil shape required of the vanes.

The movable vane sections 16 are mounted for typical movement about a radial axis 18 which passes through a spindle formation 20 integral with the upstream edge of the vane sections. The angular movement required of the movable vane sections 16 is up to a maximum deflection of approximately 70°. Clearly over such a large range of movement the arc swept by the radially outer edges 22 of the vanes has potential for interference with the annular shape of the inner surface 24 of the engine casing 8. In order to accommodate this range of vane movement and to avoid gaps between the vane radially outer edge 22 and the casing surface 24 these both conform to a part spherical surface configuration. Therefore a constant and minimal gap between the edge 22 and surface 24 may be maintained over the whole range of vane movement.

The movable vane sections 16, it will be apparent, are pivoted at their upstream edge so that, in use, at relative large angles of deflection considerable forces are generated on the pressure side of the vanes due to airstream movement. It follows therefore that to move and maintain an angular setting of the vanes considerable actuation forces are required and these result in considerable stresses within the airfoil sections of the vane.

A vane actuating mechanism (not shown) is provided on the radially outer side of annular engine casing 8. Basically this comprises a circumferentially movable unison ring to which the spindles 20 of each of the vanes is connected by means of an actuator lever (also not shown). As shown more clearly in FIG. 4 the radially outer end of the vanes is formed with a spindle extension 26 which projects through a circular aperture 28 in the engine casing 8. The actuating levers are engaged with the spindle extensions 26. The radially inner ends of the spindles 20 are also formed with a spindle projection 30 which is engaged with a bearing or bush 32, indicated in FIG. 1. Where the spindle 20 passes through the engine casing 8 an increased diameter bearing member 34 is provided concentric with the spindle and pivot axis 18. Preferably, as shown in FIG. 4 the member 34 has a chamfered surface 36 which engages, or has minimum clearance from, a similarly chamfered surface of a bush housed in the casing wall 8. Bearing loads are taken by a bearing concentric with the axis 18 and the aperture 32 in the casing 8 on an annular bearing surface 38 on the member 34. The plane of annular surface 38 is orthogonal to axis 18.

It will be appreciated that actuation loads applied to the movable vane section 16 through spindle 26 will necessarily be of considerable magnitude bearing in mind the chord length of the vane section 16 since these vanes are located in the engine intake, and therefore the vanes are of large dimension. These large forces have potential to create great stresses within the vane section which must be contained if they are not to result in the propagation of stress cracks.

The present invention provides a solution to these problems by providing the movable vane section 16 with a flange 40 at its radially outer edge. As shown in FIG. 4 flange 40 follows the part circular shape of the vane edge and tapers from a maximum width at the vane section spindle 20 towards the trailing edge 21 of the vane. In the particular embodiment the diameter of member 34 is greater than the maximum width of flange 40 and the edges of the member and the flange are blended one into the other and the flange 40 tapers in a downstream direction to the width of the vane section 16 at the trailing edge 21.

For reasons of aerodynamic and mechanical efficiency the flange 40 and member 34 on the gas path side of the vane are blended smoothly from their maximum dimension into the airfoil surface of the movable vane section. This blending is achieved by means of a curved surface generally indicated at 42 in FIG. 4. This curved surface 42 tapers into the vane width in a radially inward direction and runs out towards the trailing edge of the movable vane section 16. In this manner abrupt changes in the shape of the airfoil surface which could lead to discontinuities and stress concentrations are avoided. The flange 40 stiffens the vane in particular its torsional stiffness and raises the basic resonant frequency above the engine range thereby avoiding excitation. The flange taper and gradual blending of the undersurface of the flange into the vane airfoil surface help to avoid stress raising or stress concentrating features by gradually tapering-in ie distributing forces acting on the vane and spindle. Similarly, the chamfered surface 36 of member 34 tapers-in stresses and avoids stress raisers such as sharp corners in region subject to high forces.

As shown more clearly in FIGS. 2 and 3 the outer edges of the curved underside of member 34 and flange 40 blend into the part spherical surface 24 of the engine casing 8. Also the movable vane section 16 is mounted in the casing such that the chamfered surface 34 lies within the mounting aperture 28 in the casing surface 24 further avoiding discontinuities. The upstream of vane section 16 which comprises a spindle 20 is formed along its length with a constant radius section which is matched to a correspondingly curved section trailing edge at the downstream edge of the fixed vane sections 14.

What is claimed is:

1. A variable camber vane for a gas turbine engine comprising a fixed leading section and a movable trailing section comprising a vane section pivotally mounted about an axis through its upstream edge adjacent the downstream edge of the fixed leading section wherein a radially outer edge of the movable section and the surface of a surrounding casing are matching part-spherical surfaces in a region including at least the sweep of the movable vane section and the radially outer edge of the movable vane section is flanged and curved to match the part-spherical surface of the adjacent casing region.

2. A variable camber vane as claimed in claim 1 wherein the flanged outer edge of the vane is broadest towards the vane pivot axis.

3. A variable camber vane as claimed in claim 1 wherein the flanged outer edge is tapered towards the vane trailing edge.

4. A variable camber vane as claimed in claim 1 wherein the flanged outer edge is blended in a radial direction into the airfoil surface of the vane at least on the pressure side thereof.

5. A variable camber vane as claimed in claim 1 wherein the upstream edge of the middle section of the vane comprises a spindle formed integrally with the airfoil section of the vane concentric with the pivot axis.

6. A variable camber vane as claimed in claim 5 wherein the spindle projects in a radially outward direction and is adapted to be engaged by a vane actuation mechanism.

7. A variable camber vane as claimed in claim 6 wherein a circular bearing member for mounting the vane in an engine casing is formed integrally with the spindle and the flanged outer edge of the vane, the bearing member being concentric with the axis of the spindle and having a diameter greater than the width of the flange.

8. A variable camber vane as claimed in claim 7 wherein the bearing member is formed with a chamfered radially outer surface.

9. A variable camber vane as claimed in claim 7 wherein the radially inner surface of the bearing member is blended with the spindle and the airfoil surface of the vane.

* * * * *